(12) United States Patent
Yamada et al.

(10) Patent No.: US 7,380,630 B2
(45) Date of Patent: Jun. 3, 2008

(54) SHIFT ACTUATOR MOUNTING ARRANGEMENT FOR MOTORCYCLE

(75) Inventors: Masaichi Yamada, Shizuoka (JP); Takahiro Suzuki, Shizuoka (JP); Hiroshi Nozaki, Shizuoka (JP); Kenji Fukushima, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 456 days.

(21) Appl. No.: 11/256,040

(22) Filed: Oct. 21, 2005

(65) Prior Publication Data

US 2006/0096798 A1   May 11, 2006

(30) Foreign Application Priority Data

Oct. 25, 2004   (JP)   .............................. 2004-309043

(51) Int. Cl.
*B62M 7/00* (2006.01)

(52) U.S. Cl. ........................................ 180/230; 180/219

(58) Field of Classification Search ................ 180/230, 180/219

See application file for complete search history.

(56) References Cited

U.S. PATENT DOCUMENTS

| 3,894,442 | A | * | 7/1975 | Hembree | ....................... 74/335 |
| 6,131,682 | A | * | 10/2000 | Walker | ........................ 180/219 |
| 6,357,545 | B1 | | 3/2002 | Hori et al. | |
| 7,174,984 | B2 | * | 2/2007 | Kosugi et al. | ............... 180/219 |
| 2005/0217915 | A1 | * | 10/2005 | Kosugi et al. | ............... 180/219 |
| 2007/0251747 | A1 | * | 11/2007 | Kosugi | ........................ 180/230 |

FOREIGN PATENT DOCUMENTS

| EP | 1 502 801 A1 | 2/2005 |
| JP | 11-222043 | 8/1999 |
| JP | 2003-320861 | 11/2003 |

* cited by examiner

*Primary Examiner*—Tony H. Winner
(74) *Attorney, Agent, or Firm*—Keating & Bennett, LLP (57) ABSTRACT

A sub-frame of a motorcycle is attached to the rear end of a main frame of the motorcycle and extends rearward. An AMT (Automated Manual Transmission) mechanism is attached to the sub-frame which prevents direct conduction of heat and vibrations generated by an engine on the main frame to the AMT. The AMT mechanism includes a hydraulic clutch actuator, a hydraulic shift actuator, an accumulator, a valve block, a pump, and an oil tank.

12 Claims, 9 Drawing Sheets

SHIFT ACTUATOR MOUNTING ARRANGEMENT FOR MOTORCYCLE

BACKGROUND OF THE INVENTION

1. Field of the Invention

The present invention relates to a motorcycle that has a clutch driving device for driving a clutch and a shift driving device for driving a transmission.

2. Description of the Background Art

The AMT (Automated Manual Transmission) mechanism is conventionally proposed as a system that automates the switching (shifting) of the gear ratio of the transmission of a motorcycle and the connecting and disconnecting of the clutch. The AMT mechanism involves a shift actuator for driving the transmission and a clutch actuator for driving the clutch (see JP 2003-320861A).

In the motorcycle having the AMT mechanism disclosed in JP 2003-320861A, the shift actuator and the clutch actuator are positioned behind the cylinder block of the engine and above the transmission. Positioning the actuators near the engine in this way prevents the actuators from touching the ground during cornering of the motorcycle. This avoids reduction of the bank angle during cornering and prevents damage to the AMT mechanism when the motorcycle falls over.

However, in this conventional motorcycle, the provision of the shift actuator and clutch actuator near the engine allows direct cause heat and vibrations generated by the engine to be conducted to the actuators.

In particular, with a hydraulic shift actuator, the shifting operation is achieved by rotating the shift spindle of the transmission by predetermined angles with the pressure of the operating oil. Smoothly performing the shifting operation requires rotating the shift spindle accurately by the predetermined angles. However, when heat and vibrations are applied to the actuator, temperature and pressure variations of the operating oil and vibrations of mechanical components vary the timing and amount by which the actuator drives the shift spindle, which lowers the accuracy of the control of the shift spindle by the actuator. This makes it difficult to achieve the shifting operation smoothly. Also, heat and vibrations promote deterioration of the actuator.

With an electrically-driven shift actuator, the shifting operation is achieved by rotating the shift spindle of the transmission at given angular intervals with power from an electric motor. Smoothly performing the shifting operation requires accurately controlling the electric motor through signal lines to rotate the shift spindle accurately at the given angles. However, when heat and vibrations are applied to the actuator, the signal lines may be cut by vibrations and the signals may be varied by heat, and the efficiency of the electric motor is lowered by heat and vibrations. Furthermore, heat and vibrations promote deterioration of the actuator.

As a result, the operation of the actuator becomes unstable and the durability of the actuator is reduced.

Furthermore, the piping and wiring for the shift actuator are provided around the engine, which complicates the piping and wiring structure around the engine and involves troublesome work in attaching the actuator and fitting the piping and wiring. Moreover, the complicated piping and wiring structure around the engine increases the weight of the motorcycle.

SUMMARY OF THE INVENTION

In order to overcome the problems described above, preferred embodiments of the present invention provide a motorcycle that has a shift driving device offering stable operation and ensured durability, easy attachment and enhanced maintainability, and reduced weight.

According to a preferred embodiment of the present invention, a motorcycle includes a driving wheel, an engine that generates power, a transmission that is capable of switching to a plurality of transmitting states that transmit power to the driving wheel at different gear ratios, a clutch operable in a connected state in which the power generated by the engine is transmitted to the transmission and a disconnected state in which the power generated by the engine is not transmitted to the transmission, a main frame that holds the engine, a sub-frame that is attached to a rear end portion of the main frame to extend rearward from the rear end portion of the main frame and that holds a seat, a clutch driving device that switches the clutch between the connected state and the disconnected state, and a shift driving device that performs a shift operation to shift the transmitting state of the transmission, wherein the shift driving device is attached to the sub-frame.

In the motorcycle according to the present preferred embodiment, the power generated by the engine is transmitted to the driving wheel through the clutch and the transmission. The clutch driving device switches the clutch between the connected state and the disconnected state. The shift driving device performs a shift operation to shift the transmitting state of the transmission, whereby the gear ratio of the transmission is shifted. The engine is held by the main frame. The sub-frame is attached to the rear end portion of the main frame such that the sub-frame extends rearward from the rear end portion of the main frame. The sub-frame holds a seat. The shift driving device is attached to the sub-frame.

As described above, the shift driving device is positioned away from the engine that generates heat and vibrations and attached to the sub-frame that is independent from the main frame that holds the engine, which prevents direct conduction of heat and vibrations from the engine to the shift driving device. This ensures stable operation and durability of the shift driving device.

Also, because the piping and wiring of the shift driving device can be attached to the sub-frame, the process of attaching the shift driving device and the process of piping and wiring can be performed separately from the assembly of the main frame. This facilitates the attachment of the shift driving device and the piping and wiring process and enhances the maintainability.

Furthermore, because the piping and wiring of the shift driving device can together be attached to the sub-frame, the piping and wiring structure around the engine is simplified and excessive provision of piping and wiring is avoided. This allows for weight reduction of the motorcycle to be achieved.

The clutch driving device may be attached to the sub-frame. In this case, the clutch driving device is positioned away from the engine that generates heat and vibrations and attached to the sub-frame that is independent from the main frame that holds the engine, which prevents direct conduction of heat and vibrations from the engine to the clutch driving device. This ensures stable operation and durability of the clutch driving device.

Also, because the piping and wiring of the clutch driving device can be attached to the sub-frame, the process of attaching the clutch driving device and the process of piping and wiring can be performed separately from the assembly of the main frame. This facilitates the attachment of the clutch driving device and the piping and wiring process and enhances the maintainability.

Furthermore, because the piping and wiring of the clutch driving device can together be attached to the sub-frame, the piping and wiring structure around the engine is simplified and excessive provision of piping and wiring is avoided. This allows further weight reduction of the motorcycle.

The shift driving device may be a hydraulic shift driving device. In this case, the hydraulic shift driving device is positioned away from the engine and attached to the sub-frame that is independent from the main frame.

This prevents direct conduction of heat and vibrations generated by the engine to the hydraulic shift driving device. This prevents temperature and pressure variations of the operating fluid for the hydraulic shift driving device and prevents vibrations of mechanical components, which in turn prevents variations in timing and amount of driving of the shift driving device. The shift driving device is thus capable of highly accurately controlling the transmission. At the same time, it is possible to prevent deterioration of the hydraulic shift driving device that would be caused by heat and vibrations.

The clutch driving device may be a hydraulic clutch driving device. In this case, the hydraulic clutch driving device is positioned away from the engine and attached to the sub-frame that is independent from the main frame.

This prevents direct conduction of heat and vibrations generated by the engine to the hydraulic clutch driving device. This prevents temperature and pressure variations of the operating fluid for the hydraulic clutch driving device and prevents vibrations of mechanical components, which in turn prevents variations in timing and amount of driving of the clutch driving device. The clutch driving device is thus capable of highly accurately controlling the clutch. At the same time, it is possible to prevent deterioration of the hydraulic clutch driving device that would be caused by heat and vibrations.

The motorcycle may further include a pump that generates a hydraulic pressure supplied to the hydraulic shift driving device and the hydraulic clutch driving device, and the pump may be attached to the sub-frame.

In this case, the hydraulic shift driving device and the hydraulic clutch driving device operate with the hydraulic pressure generated by the pump. The pump is attached to the sub-frame, which prevents direct conduction of heat and vibrations generated by the engine to the pump. This prevents malfunctions of the pump that would be caused by heat and vibrations. This also prevents breakage of signal lines of the pump caused by vibrations, and prevents variations of signals of the pump, and also prevents deterioration of efficiency of the pump that would be caused by heat and vibrations.

The motorcycle may further include a fluid path switching valve that switches a fluid path that circulates through the hydraulic shift driving device, the hydraulic clutch driving device, and the pump. The fluid path switching valve may be attached to the sub-frame.

In this case, the fluid path switching valve switches the fluid path that circulates through the hydraulic shift driving device, the hydraulic clutch driving device, and the pump. The fluid path switching valve is attached to the sub-frame, which prevents direct conduction of heat and vibrations generated by the engine to the fluid path switching valve. This prevents malfunctions of the fluid path switching valve.

Also, attaching the fluid path switching valve to the sub-frame simplifies the piping that connects the fluid path switching valve with the shift driving device and the clutch driving device. This allows further weight reduction of the motorcycle.

The motorcycle may further include a pressure accumulator that accumulates a pressure of an operating fluid supplied to the hydraulic shift driving device and the hydraulic clutch driving device, and the pressure accumulator may be attached to the sub-frame.

In this case, the pressure accumulator accumulates the pressure of the operating fluid that is supplied to the hydraulic shift driving device and the hydraulic clutch driving device. This prevents shortage of the pressure required to operate the hydraulic shift driving device and the hydraulic clutch driving device. The pressure accumulator is attached to the sub-frame, which prevents direct conduction of heat and vibrations generated by the engine to the pressure accumulator. This prevents deterioration of the pressure accumulator.

Also, attaching the pressure accumulator to the sub-frame simplifies the piping that connects the pressure accumulator with the shift driving device and the clutch driving device. This allows further weight reduction of the motorcycle.

The motorcycle may further include a storage tank that stores an operating fluid supplied to the hydraulic shift driving device and the hydraulic clutch driving device, and the storage tank may be attached to the sub-frame.

In this case, the storage tank stores the operating fluid that is supplied to the hydraulic shift driving device and the hydraulic clutch driving device. The storage tank is attached to the sub-frame, which prevents direct conduction of heat and vibrations generated by the engine to the storage tank. This prevents temperature and pressure variations of the operating fluid stored in the storage tank. This prevents malfunctions of the shift driving device and the clutch driving device.

Also, attaching the storage tank to the sub-frame simplifies the piping that connects the storage tank with the shift driving device and the clutch driving device. This allows further weight reduction of the motorcycle.

The shift driving device may be an electrically-driven shift driving device. In this case, the electrically-driven shift driving device is positioned away from the engine and attached to the sub-frame that is independent from the main frame that holds the engine.

This prevents direct conduction of heat and vibrations generated by the engine to the electrically-driven shift driving device. This prevents signal line breakage due to vibrations and signal variations due to heat, and also prevents reduction of efficiency of the electrically-driven shift driving device that would be caused by heat and vibrations.

The clutch driving device may be an electrically-driven clutch driving device. In this case, the electrically-driven clutch driving device is positioned away from the engine and attached to the sub-frame that is independent from the main frame that holds the engine.

This prevents direct conduction of heat and vibrations generated by the engine to the electrically-driven clutch driving device. This prevents signal line breakage due to vibrations and signal variations due to heat, and also prevents reduction of efficiency of the electrically-driven clutch driving device that would be caused by heat and vibrations.

The shift driving device may include a first electric motor and a transmitting mechanism that transmits power of the first electric motor to the transmission, and the clutch driving device may include a second electric motor and a master cylinder that converts power of the second electric motor into a hydraulic pressure, and the first electric motor, the second electric motor, and the master cylinder may be attached to the sub-frame.

In this case, the transmitting mechanism transmits power of the first electric motor to the transmission, and the transmitting state of the transmission is thus changed. Also, the master cylinder converts power of the second electric motor into hydraulic pressure and the hydraulic pressure is used to switch the clutch between the connected state and the disconnected state.

The first electric motor, the second electric motor, and the master cylinder are attached to the sub-frame, which prevents direct conduction of heat and vibrations generated by the engine to the first electric motor, second electric motor, and master cylinder. This prevents breakage of signal lines of the first and second electric motors due to vibrations, and prevents variations of signals of the first and second electric motors due to heat, and also prevents deterioration of efficiency of the first and second electric motors that would be caused by heat and vibrations. At the same time, it is possible to prevent temperature and pressure variations of operating fluid in the master cylinder, caused by heat and vibrations, to prevent malfunctions of the master cylinder.

The motorcycle may further include a battery that accumulates electric power and an electric component that operates with the electric power accumulated in the battery, and the battery may be held by the main frame in a position further forward than the engine.

In this case, the electric component operates with the electric power accumulated in the battery. The battery is held by the main frame in a position further forward than the engine and such that a sufficient space is ensured to attach the shift driving device to the sub-frame. The shift driving device can thus be attached to the sub-frame without having to increase the size in the vicinity of the sub-frame.

Other features, elements, characteristics, and advantages of the present invention will become more apparent from the following description of preferred embodiments of the present invention with reference to the attached drawings.

DETAILED DESCRIPTION OF PREFERRED EMBODIMENTS

First Preferred Embodiment

Figure 1:
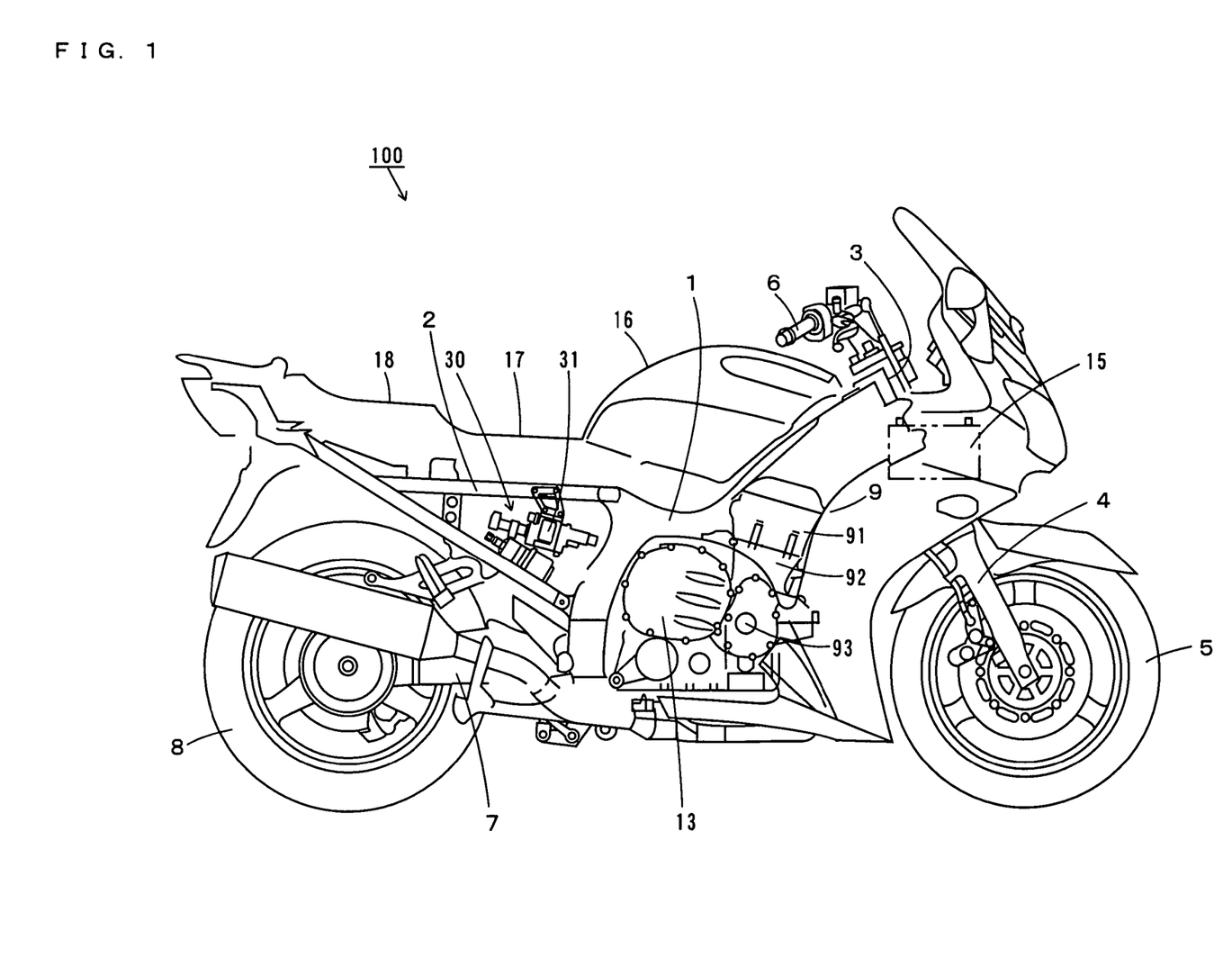
FIG. 1 is a right-side view of a motorcycle according to a first preferred embodiment of the present invention.
Figure 2:
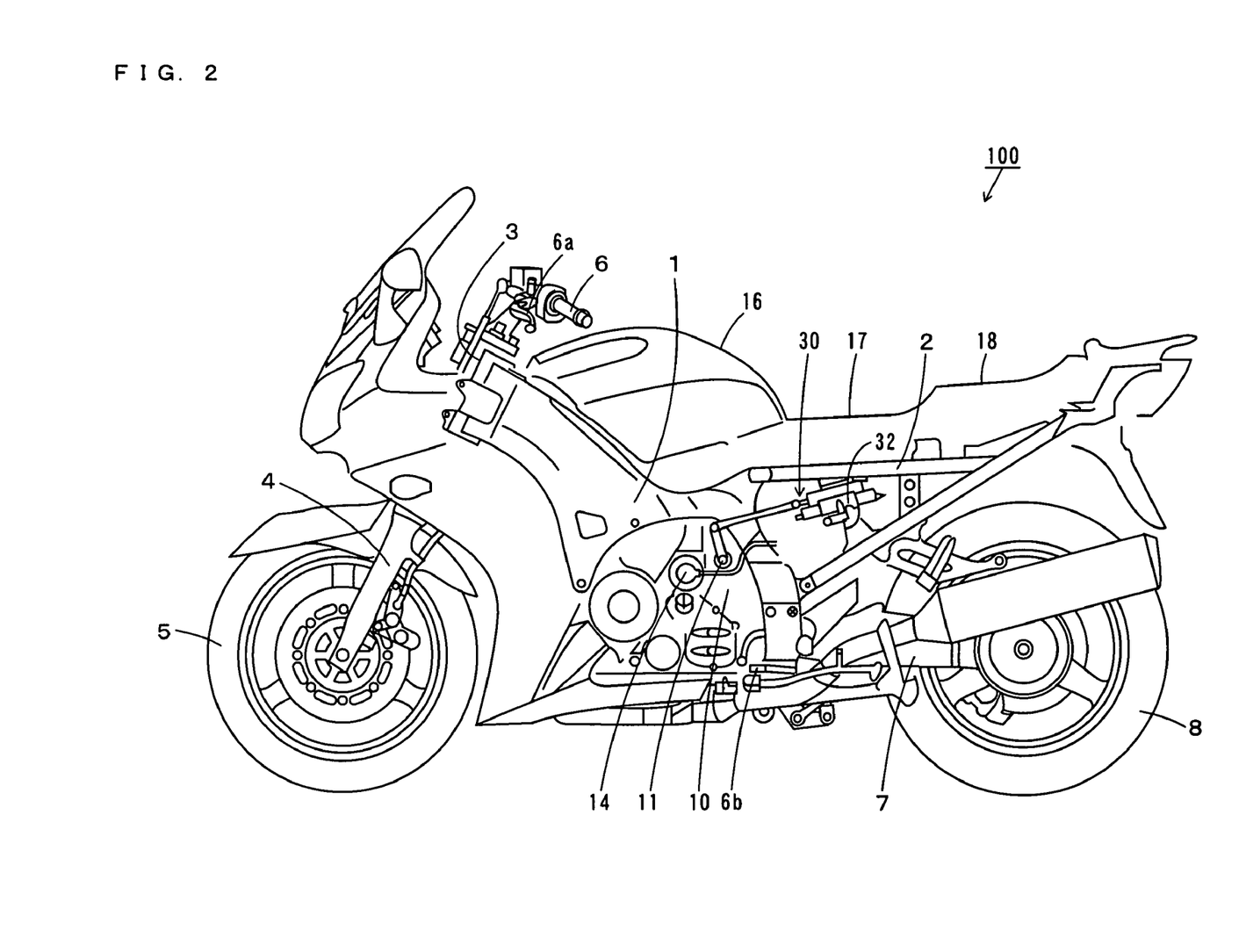
FIG. 2 is a left-side view of the motorcycle according to the first preferred embodiment of the present invention.
Figure 3:
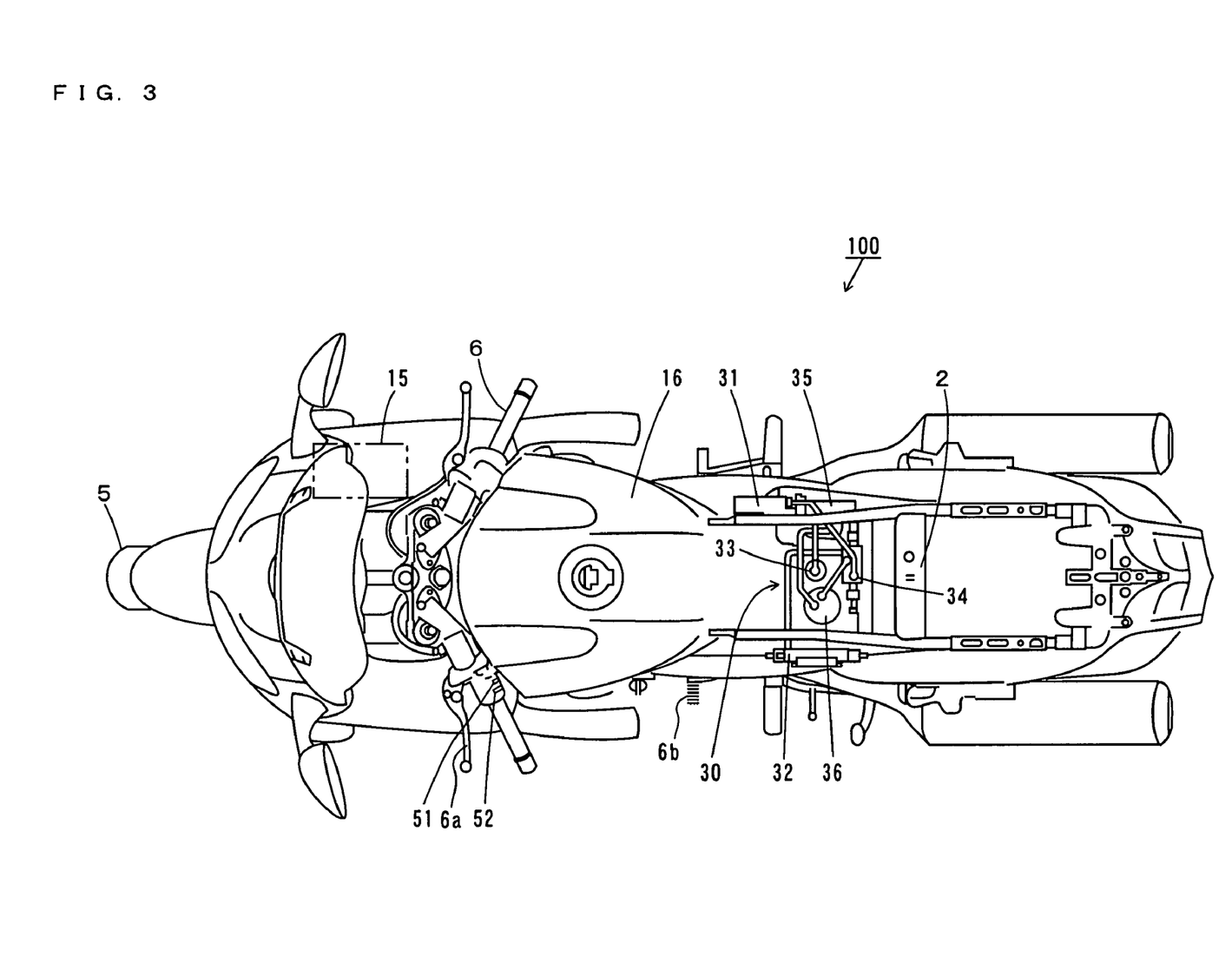
FIG. 3 is a plan view of the motorcycle according to the first preferred embodiment of the present invention.

FIG. 1 is a right-side view of a motorcycle according to a first preferred embodiment of the present invention, FIG. 2 is a left-side view of the motorcycle, and FIG. 3 is a plan view of the motorcycle as seen from above.

As shown in FIGS. 1 and 2, the motorcycle 100 has a main frame 1. A sub-frame 2 is attached to the rear end of the main frame 1 and extends rearward.

The main frame 1 is provided with a head pipe 3 at its front end. The head pipe 3 is provided with a front fork 4 that can swing left and right. A front wheel 5 is rotatably supported at the lower end of the front fork 4. A handle 6 is attached to the top end of the head pipe 3.

A rear arm 7 is disposed to extend rearward from below the main frame 1. A rear wheel 8 is rotatably supported at the rear end of the rear arm 7.

An engine 9 is held in a center portion of the main frame 1. The engine 9 includes a cylinder head 91, a cylinder block 92, and a crankshaft 93. As shown in FIG. 2, a transmission 10 is disposed at the rear of the engine 9. The transmission 10 has a shift spindle 11. A shift pedal 6b is connected to the transmission 10.

The transmission 10 is connected with a clutch 12 (see FIG. 7) that is covered by a clutch cover 13 shown in FIG. 1. The clutch 12 has a clutch release piston 14 as shown in FIG. 2.

Power from the crankshaft 93 of FIG. 1 is transmitted to the transmission 10 of FIG. 2 through the clutch 12. Power of the drive shaft of the transmission 10 is transmitted to the rear wheel 8 through a chain (not shown).

As shown by two-dot-chain lines in FIGS. 1 and 3, a battery 15 is disposed in front of the main frame 1. The battery 15 is positioned further forward than the crankshaft 93 of the engine 9 and supplies power to electric components such as various lamps, electric motors, meters, and a controller 50 described later. A fuel tank 16 is provided above the main frame 1.

A main seat 17 and a tandem seat 18 are provided above the sub-frame 2. An AMT mechanism 30 is attached to the sub-frame 2. As shown in FIG. 3, the AMT mechanism 30 includes a hydraulic clutch actuator 31, a hydraulic shift actuator 32, an accumulator 33, a valve block 34, a pump 35, and an oil tank 36. In FIG. 3, the main seat 17 and the tandem seat 18 are omitted to show the sub-frame 2 and the AMT mechanism 30. The AMT mechanism 30 will be fully described later.

The handle 6 has a clutch lever 6a, an AMT/MT switch 51, and a shift switch 52 attached thereto.

The AMT/MT switch 51 is used to establish an AMT (Automated Manual Transmission) mode in which the clutch 12 is automatically connected and disconnected and an MT (Manual Transmission) mode in which the clutch 12 is manually connected and disconnected. The shift switch 52 is operated when the driver performs a shift operation to change the gear ratio of the transmission 10 in the AMT mode.

In the AMT mode, as the driver operates the shift switch 52, the clutch actuator 31 of the AMT mechanism 30 connects and disconnects the clutch 12, and the shift actuator 32 shifts the gear ratio of the transmission 10. In the MT mode, the driver operates the clutch lever 6a to connect and disconnect the clutch 12 and operates the shift pedal 6b to shift the gear ratio of the transmission 10.

Figure 4:
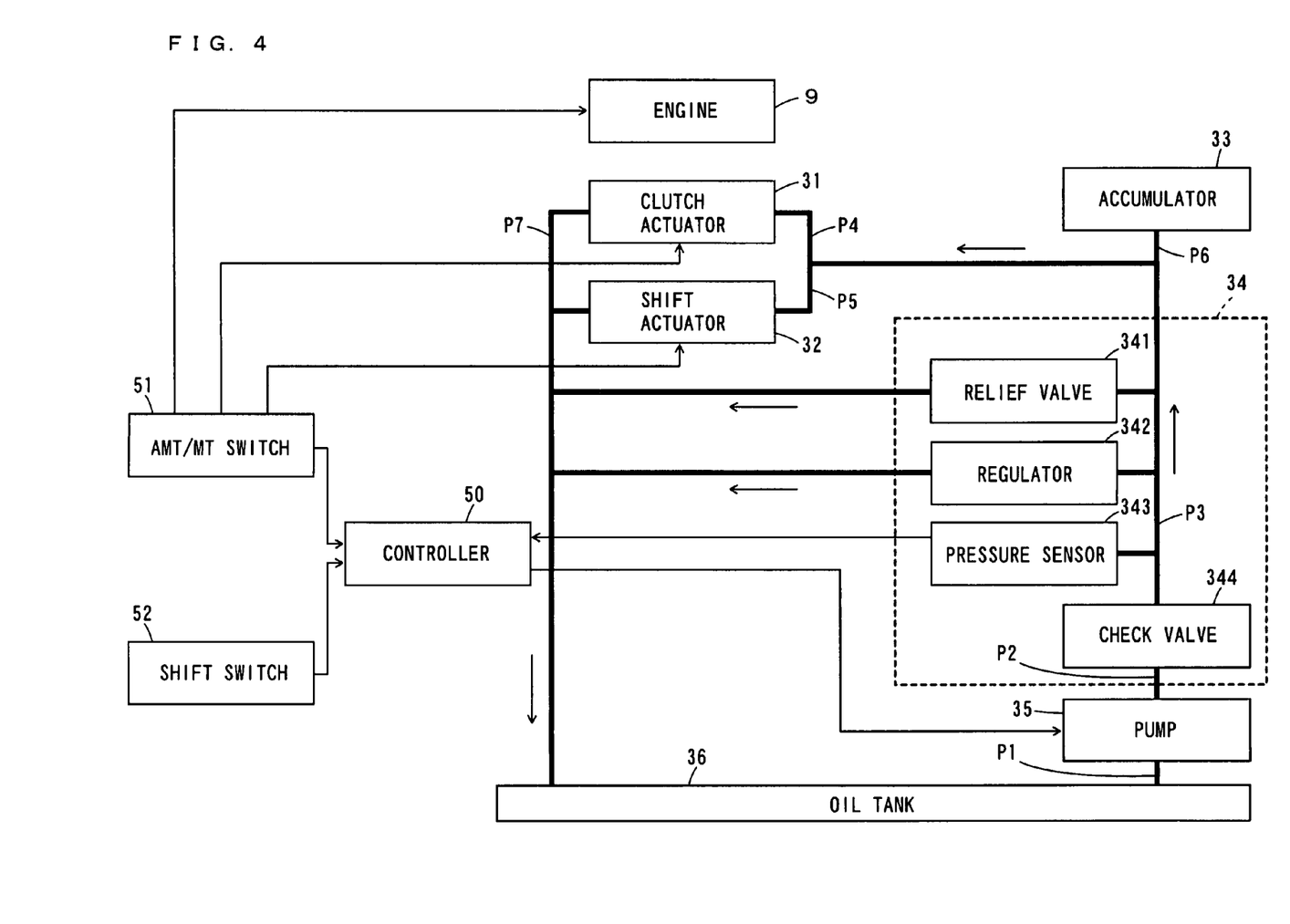
FIG. 4 is a block diagram illustrating the hydraulic system and control system of the AMT mechanism.

FIG. 4 is a block diagram showing the hydraulic system and control system of the AMT mechanism.

As shown in FIG. 4, the valve block 34 includes a relief valve 341, a regulator 342, a pressure sensor 343, and a check valve 344.

The clutch actuator 31, shift actuator 32, pressure sensor 343, pump 35, engine 9, AMT/MT switch 51, and shift switch 52 are connected to the controller 50 through signal lines.

The controller 50 receives signals from the AMT/MT switch 51, shift switch 52, and pressure sensor 343, and controls the engine 9, clutch actuator 31, shift actuator 32, and pump 35.

The oil tank 36 stores an operating oil. The pump 35 pumps the operating oil from the oil tank 36 through a pipe P1 and supplies the operating oil to the valve block 34 through a pipe P2. The operating oil supplied to the valve block 34 is supplied to the pressure sensor 343, regulator 342, and relief valve 341.

The pressure sensor 343 measures the pressure in a pipe P3 and gives a signal indicating the measured value to the controller 50. On the basis of the signal from the pressure sensor 343, the controller 50 drives an electric motor of the pump 35 when the pressure in the pipe P3 falls below a predetermined value, and stops the electric motor of the pump 35 when the pressure in the pipe P3 reaches a predetermined value. The pressure of the operating oil downstream of the check valve 344 is thus controlled within a given range.

The regulator 342 becomes operable when the pressure of the operating oil in the pipe P3 reaches a certain value over the control range of the controller 50, so as to cause the operating oil in the pipe P3 to flow into a pipe P7 that is connected to the oil tank 36. This prevents components of the hydraulic system from being broken by excessive pressure of the operating oil.

The user can manually release the relief valve 341 in case of emergency. When the regulator 342 is broken, for example, this allows the operating oil in the pipe P3 to flow into the pipe P7 connected to the oil tank 36.

The pipe P3 of the valve block 34 is connected to pipes P4, P5, and P6. The operating oil in the pipe P3 is supplied to the accumulator 33 through the pipe P6. The accumulator 33 temporarily accumulates the operating oil and supplies it to the clutch actuator 31 and the shift actuator 32 through the pipes P4 and P5.

The clutch actuator 31 drives the clutch release piston 14 of the clutch 12 to change the clutch 12 from the connected state to the disconnected state. The shift actuator 32 drives the shift spindle 11 of the transmission 10 to change the gear ratio of the transmission 10. The operating oil discharged from the clutch actuator 31 and the shift actuator 32 is returned to the oil tank 36 through the pipe P7.

Figure 5:
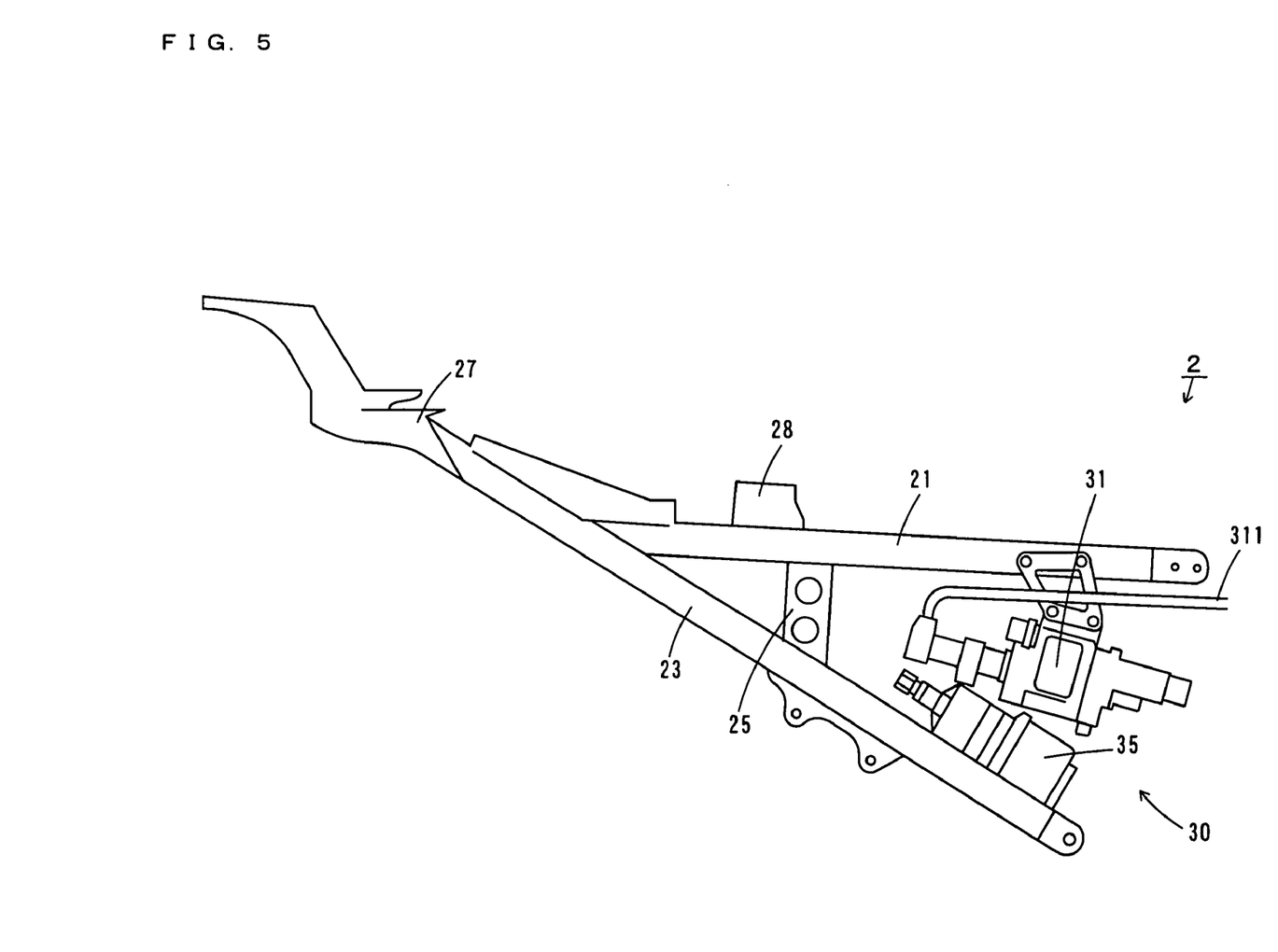
FIG. 5 is a right-side view showing the details of the sub-frame and AMT mechanism.
Figure 6:
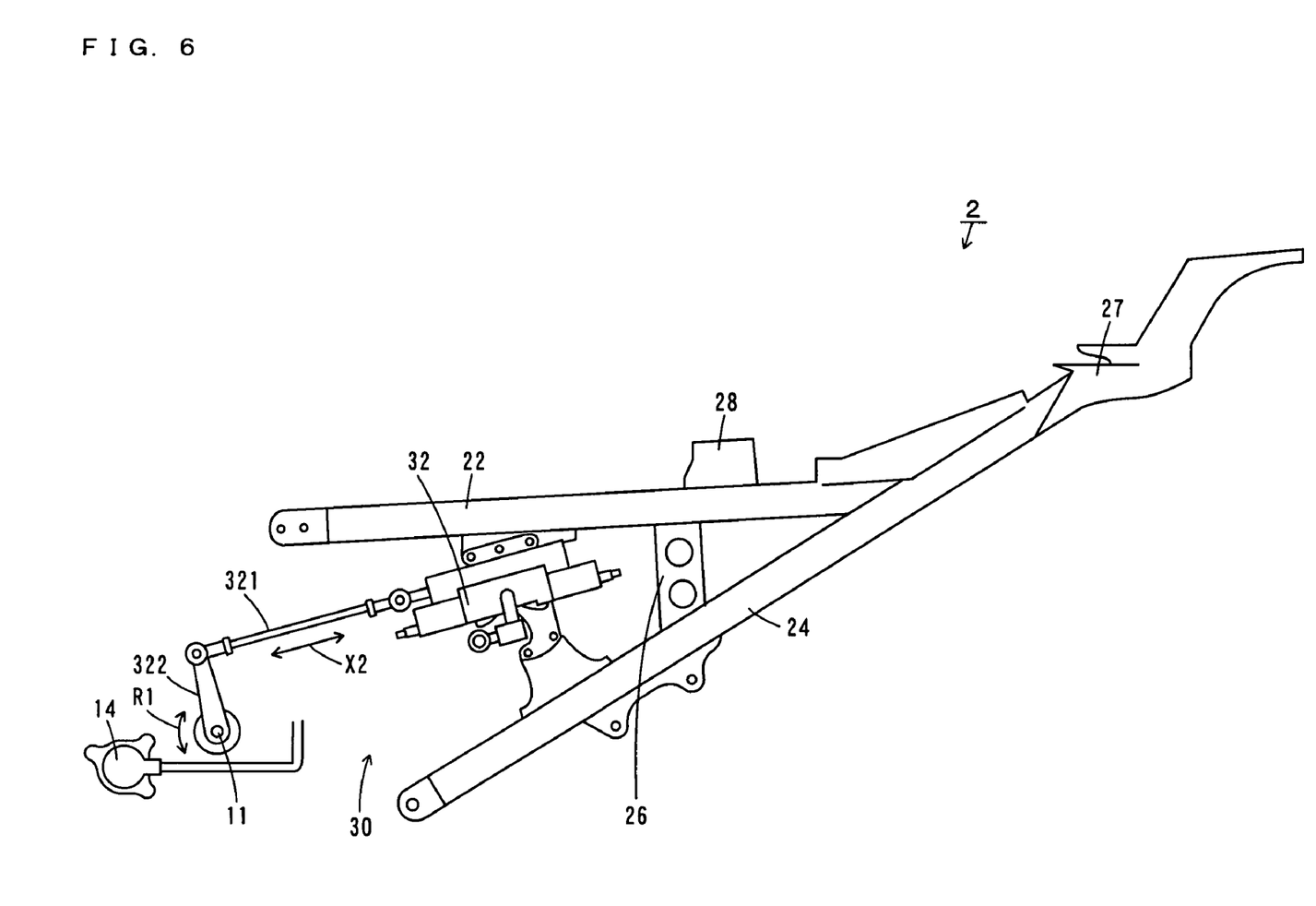
FIG. 6 is a left-side view showing the details of the sub-frame and AMT mechanism.
Figure 7:
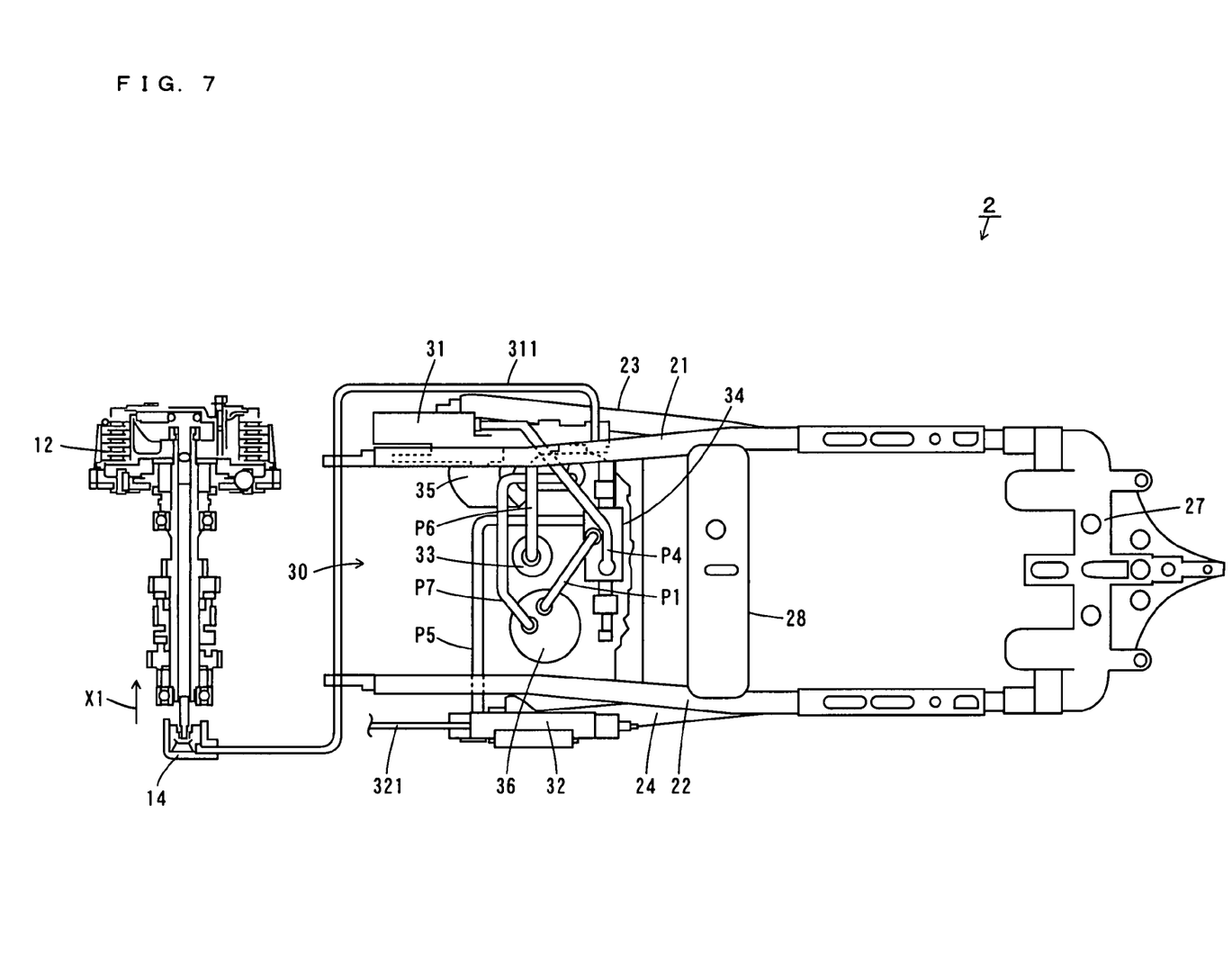
FIG. 7 is a plan view showing the details of the sub-frame and AMT mechanism.

FIG. 5 is a right-side view showing the details of the sub-frame and the AMT mechanism, FIG. 6 is a left-side view showing the details of the sub-frame and the AMT mechanism, and FIG. 7 is a plan view showing the details of the sub-frame and the AMT mechanism.

The sub-frame 2 includes a pair of main support members 21 and 22, a pair of sub-support members 23 and 24, a pair of auxiliary members 25 and 26, an end coupler 27, and a center coupler 28.

One end of the main support member 21 and one end of the main support member 22 are obliquely attached respectively to the center portions of the sub-support members 23 and 24 so that the main support members 21 and 22 and the sub support members 23 and 24 are respectively arranged in a substantially V-shaped configuration. The auxiliary members 25 and 26 are attached respectively to the main support members 21 and 22 and the sub-support members 23 and 24.

One end of the sub-support member 23 and one end of the sub-support member 24 are coupled together by the end coupler 27. The main support members 21 and 22 are coupled together by the center coupler 28.

The other ends of the pair of main support members 21 and 22 and the other ends of the pair of sub-support members 23 and 24 are attached to the main frame 1 shown in FIGS. 1 and 2.

In the direction in which the motorcycle 100 travels, the main support member 21 and the sub-support member 23 are disposed on the right side and the main support member 22 and the sub-support member 24 are disposed on the left side.

The clutch actuator 31, shift actuator 32, accumulator 33, valve block 34, pump 35, and oil tank 36 are attached to the sub-frame 2.

The clutch actuator 31 is disposed between the main support member 21 and the sub-support member 23 on the right side and attached to the main support member 21. The pump 35 is disposed between the main support member 21 and the sub-support member 23 on the right side and attached to the sub-support member 23. The shift actuator 32 is disposed between the main support member 22 and the sub-support member 24 on the left side and attached to the main support member 22 and the sub-support member 24.

The accumulator 33, valve block 34, and oil tank 36 are disposed in the space between the pair of main support members 21 and 22 and between the pair of sub-support members 23 and 24 and are attached to the main support members 21 and 22.

The clutch actuator 31 is connected to the clutch release piston 14 of the clutch 12 through a metal pipe 311.

The shift actuator 32 has a shift link rod 321 that axially reciprocates. A shift arm 322 has its one end rotatably attached to the end of the shift link rod 321. The other end of the shift arm 322 is attached to the shift spindle 11 of the transmission 10 of FIG. 1.

Preferably, the clutch actuator 31, shift actuator 32, accumulator 33, valve block 34, pump 35, and oil tank 36 are attached to the sub-frame 2 with a vibration preventing member preferably made of, e.g., rubber or any other suitable material, interposed between them.

In the steady condition, the clutch 12 is energized into the connected state by, e.g., a spring. The clutch actuator 31 drives the clutch release piston 14 in the direction shown by arrow X1 in FIG. 7 with the pressure of the operating oil in the pipe 311. This places the clutch 12 in the disconnected state.

The shift actuator 32 reciprocates the shift link rod 321 as shown by arrow X2 in FIG. 6. This rotates the shift spindle 11 as shown by arrow R1 to change the gear ratio of the transmission 10.

In the motorcycle of the present preferred embodiment, the power generated by the engine 9 is transmitted to the rear wheel 8 through the clutch 12 and the transmission 10. In the AMT mode, as the driver operates the shift switch 52, the hydraulic clutch actuator 31 switches the clutch 12 from the connected state to the disconnected state, and the hydraulic shift actuator 32 performs shifting of the transmission 10 to change the gear ratio of the transmission 10.

In this way, the hydraulic clutch actuator 31 and the hydraulic shift actuator 32 are separated away from the engine 9 that generates heat and vibrations, and are attached to the sub-frame 2 that is discrete from the main frame 1 that holds the engine 9, which prevents direct conduction of heat and vibrations from the engine 9 to the clutch actuator 31 and the shift actuator 32.

This prevents temperature and pressure variations of the operating oil and prevents vibrations of the mechanical components, which in turn prevents variations in timing and amount of driving of the clutch actuator 31 and the shift actuator 32. Then, the clutch actuator 31 controls the clutch 12 with enhanced accuracy and the shift actuator 32 controls the transmission 10 with enhanced accuracy. At the same time, it is possible to prevent deterioration of the clutch actuator 31 and the shift actuator 32 that is caused by heat and vibrations. The clutch actuator 31 and the shift actuator 32 thus offer stable operations and ensured durability.

Furthermore, because the piping and wiring for the clutch actuator 31 and the shift actuator 32 are attached to the sub-frame 2, the process of attaching the clutch actuator 31 and the shift actuator 32 and the process of piping and wiring can be performed separately from the assembly of the main frame 1. This facilitates the attachment of the clutch actuator 31 and the shift actuator 32 and the piping and wiring processes and improves maintainability.

Moreover, because the piping and wiring of the clutch actuator 31 and the shift actuator 32 are attached to the sub-frame 2 together with each other, the piping and wiring structure around the engine 9 is simplified and excessive provision of piping and wiring is avoided. This reduces the weight of the motorcycle 100.

Also, the accumulator 33, valve block 34, pump 35, and oil tank 36 are attached to the sub-frame 2 together with the hydraulic clutch actuator 31 and the hydraulic shift actuator 32, which prevents direct conduction of heat and vibrations generated by the engine 9 to the accumulator 33, valve block 34, pump 35, and oil tank 36.

This prevents temperature and pressure variations of the operating oil that would be caused by heat and vibrations. This prevents malfunctions of the valve block 34 and the pump 35. Also, this prevents breakage of signal lines of the electric motor of the pump 35 caused by vibrations, prevents variations of signals of the electric motor of the pump 35, and also prevents deterioration of efficiency of the electric motor of the pump 35 that would be caused by heat and vibrations.

Moreover, the pipes P1 to P7, connecting the clutch actuator 31, shift actuator 32, accumulator 33, valve block 34, pump 35, and oil tank 36 are simplified, which further reduces the weight of the motorcycle 100.

Also, the accumulator 33, valve block 34, pump 35, and oil tank 36 are prevented from being deteriorated by heat and vibrations. This enhances the durability of the accumulator 33, valve block 34, pump 35, and oil tank 36.

Moreover, because the battery 15 is held by the main frame 1 in a position further forward than the engine 9, a sufficient space for holding the clutch actuator 31 and shift actuator 32 is ensured in the vicinity of the sub-frame 2 in attaching them to the sub-frame 2. This makes it possible to easily attach the clutch actuator 31 and the shift actuator 32 without a need to increase the size in the vicinity of the sub-frame 2.

Second Preferred Embodiment

Figure 8:
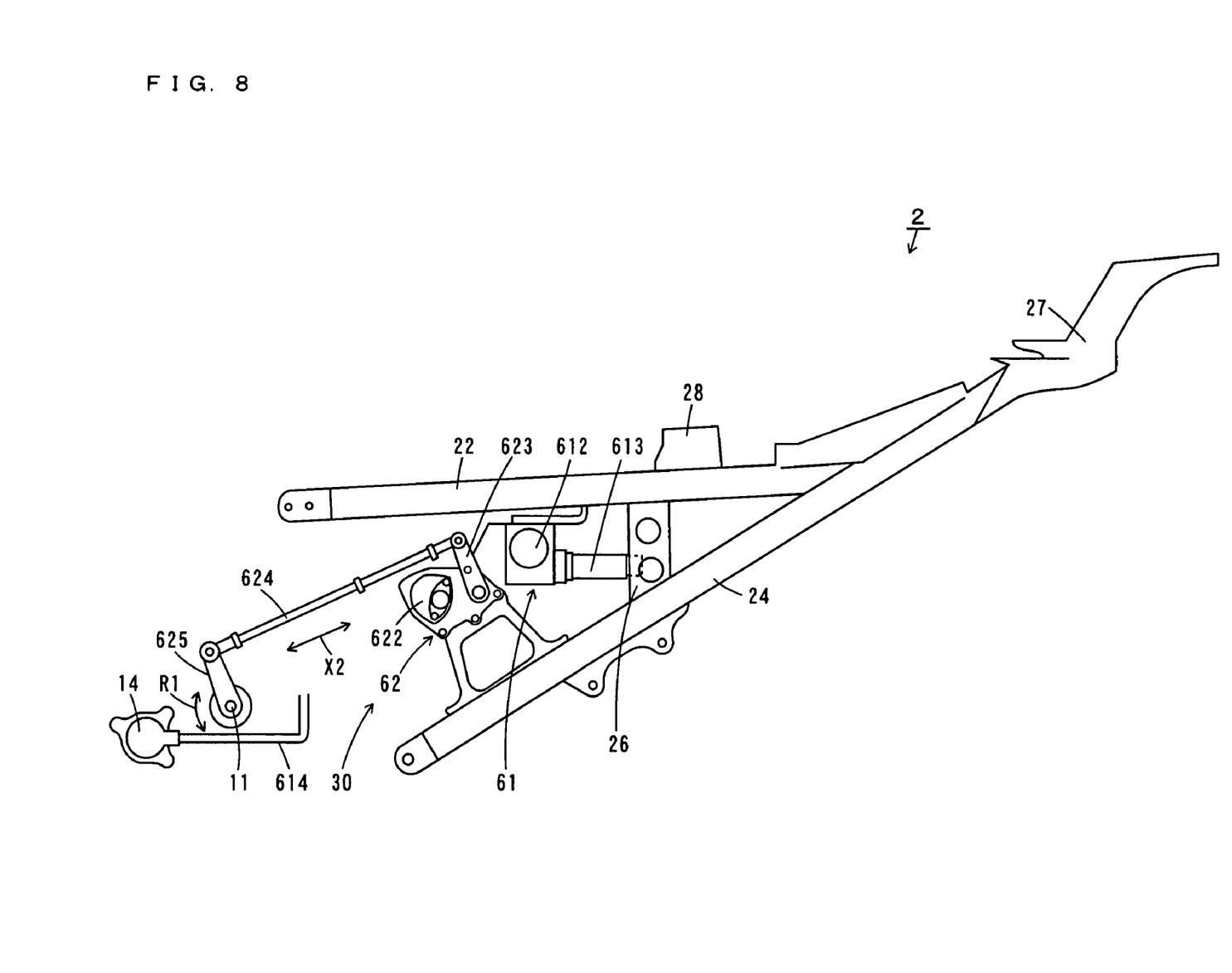
FIG. 8 is a left-side view showing the details of a sub-frame and an AMT mechanism of a motorcycle according to a second preferred embodiment of the present invention.
Figure 9:
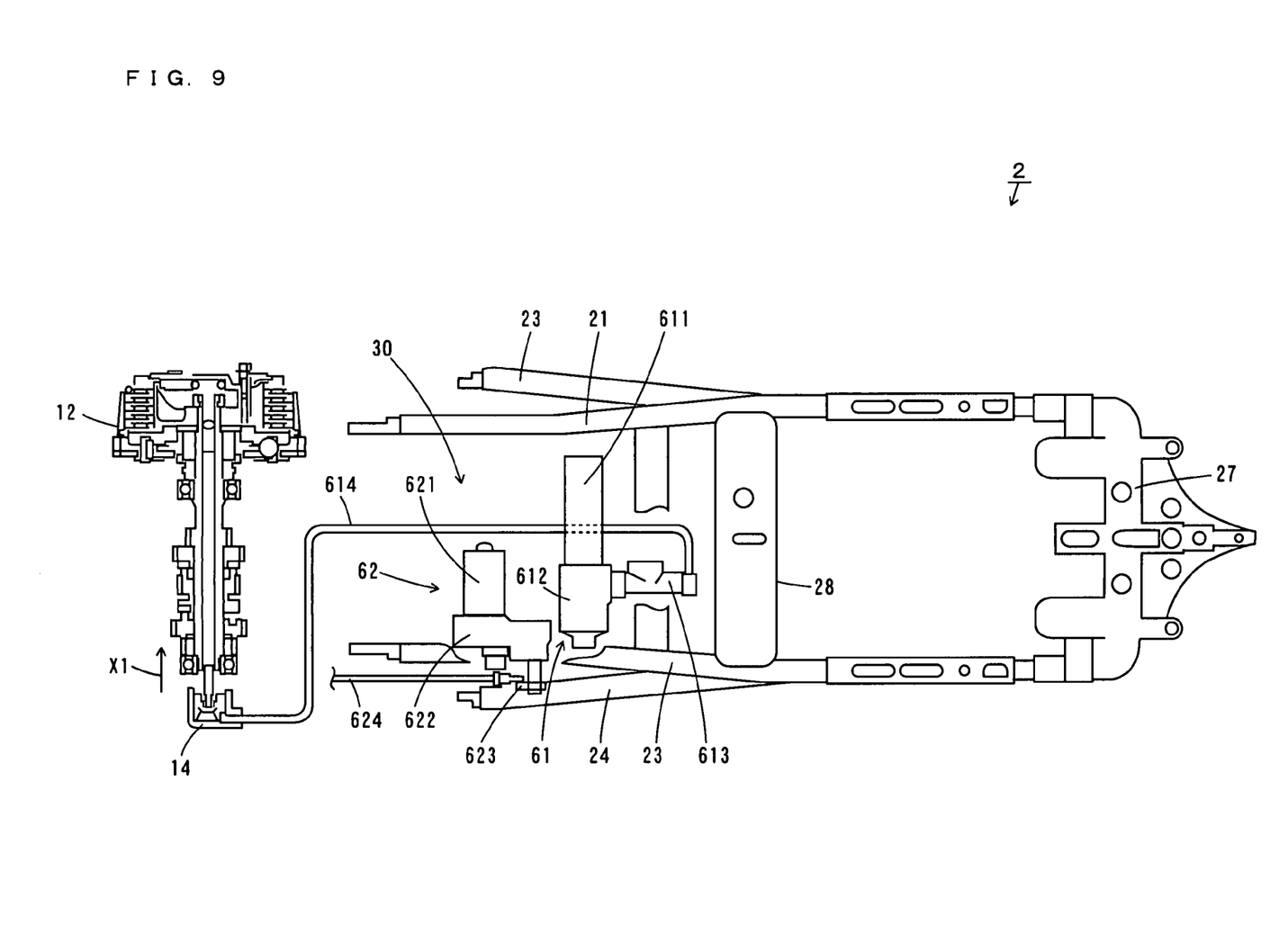
FIG. 9 is a plan view showing the details of the sub-frame and the AMT mechanism of the motorcycle according to the second preferred embodiment of the present invention.

FIG. 8 is a left-side view showing the details of a sub-frame and an AMT mechanism of a motorcycle according to a second preferred embodiment of the present invention, and FIG. 9 is a plan view showing the details of the sub-frame and the AMT mechanism of the motorcycle.

The motorcycle of the present preferred embodiment differs from the motorcycle 100 of the first preferred embodiment in that the AMT mechanism 30 includes an electrically-driven clutch actuator 61 and an electrically-driven shift actuator 62 in place of the hydraulic clutch actuator 31 and the hydraulic shift actuator 32.

The clutch actuator 61 and the shift actuator 62 are attached to the sub-frame 2.

As shown in FIG. 9, the clutch actuator 61 has an electric motor 611, a gearbox 612, and a master cylinder 613. The shift actuator 62 has an electric motor 621 and a gearbox 622.

The clutch actuator 61 is disposed between the main support member 21 on the right side and the main support member 22 on the left side and attached to the main support member 22 as shown in FIG. 8. The shift actuator 62 is disposed between the main support member 22 on the left side and the sub-support member 24 on the left side and attached to the sub-support member 24.

As shown in FIG. 9, the master cylinder 613 of the clutch actuator 61 is connected to the clutch release piston 14 of the clutch 12 through a metal pipe 614.

As shown in FIG. 8, a link member 623 is coupled to the gearbox 622 of the shift actuator 62. One end of a shift link rod 624 is rotatably attached to the link member 623, and one end of a shift arm 625 is rotatably attached to the other end of the shift link rod 624. The other end of the shift arm 625 is attached to the shift spindle 11 of the transmission 10 shown in FIG. 1.

The gearbox 612 of the clutch actuator 61 converts rotation of the electric motor 611 to reciprocation to drive the master cylinder 613. Then, the master cylinder 613 drives the clutch release piston 14 in the direction shown by arrow X1 in FIG. 9 with the pressure of the operating oil in the pipe 614. This places the clutch 12 in the disconnected state.

The electric motor 621 of the shift actuator 62 reciprocates the shift link rod 624 as shown by arrow X2 in FIG. 8 through the gearbox 622. This causes the shift spindle 11 to rotate as shown by arrow R1, and the gear ratio of the transmission 10 is thus changed.

In the motorcycle of the present preferred embodiment, the electrically-driven clutch actuator 61 and the electrically-driven shift actuator 62 are separated away from the engine 9 and attached to the sub-frame 2 that is discrete from the main frame 1 that holds the engine 9.

This prevents direct conduction of heat and vibrations generated by the engine 9 to the clutch actuator 61 and the shift actuator 62. This prevents breakage of signal lines caused by vibrations and prevents variations of signals caused by heat, and also prevents deterioration of efficiency of the clutch actuator 61 and the shift actuator 62 that would be caused by heat and vibrations. This further prevents deterioration of the clutch actuator 61 and the shift actuator 62 caused by heat and vibrations. As a result, the clutch actuator 61 and the shift actuator 62 offer stable operations and ensured durability.

Furthermore, because the piping and wiring for the clutch actuator 61 and the shift actuator 62 are attached to the sub-frame 2, the process of attaching the clutch actuator 61 and the shift actuator 62 and the process of piping and wiring can be performed separately from the assembly of the main frame 1. This facilitates the attachment and piping and wiring of the clutch actuator 61 and the shift actuator 62 and improves maintainability.

Moreover, because the piping and wiring of the clutch actuator 61 and the shift actuator 62 are attached to the sub-frame 2 together with each other, the piping and wiring structure around the engine 9 is simplified and excessive provision of piping and wiring is avoided. This reduces the weight of the motorcycle 100.

(3) Other Preferred Embodiments

While the preferred embodiments described above have shown the sub-frame 2 directly attached to the main frame 1, a member for preventing vibrations, e.g., made of rubber or any other suitable material, may be placed between the main frame 1 and the sub-frame 2. This more reliably and securely prevents conduction of vibrations from the engine 9 to the AMT mechanism 30.

Also, while the first preferred embodiment uses the hydraulic clutch actuator 31 and the hydraulic shift actuator 32 and the second preferred embodiment uses the electrically-driven clutch actuator 61 and the electrically-driven shift actuator 62, the hydraulic clutch actuator 31 and the electrically-driven shift actuator 62 may be used in combination, or the electrically-driven clutch actuator 61 and the hydraulic shift actuator 32 may be used in combination.

Also, the positions in which the clutch actuator 31 and the shift actuator 32 are attached to the sub-frame 2 are not limited to those shown in above preferred embodiments, but the clutch actuator 31 and the shift actuator 32 can be attached to the sub-frame 2 in any desired position.

Also, while both of the clutch actuator 31 or 61 and the shift actuator 32 or 62 are attached to the sub-frame 2 in the preferred embodiments, the clutch actuator 31 or 61 may be attached not to the sub-frame 2 but to the main frame 1 or to any other portion of the motorcycle.

Also, while the motorcycles of the preferred embodiments are switchable between the AMT mode and MT mode, the motorcycles may be provided only with the AMT mode.

In the following two paragraphs, non-limiting examples of correspondences between various elements recited in the claims below and those described above with respect to various preferred embodiments of the present invention are explained.

In the preferred embodiments described above, the shift actuators 32 and 62 correspond to a shift driving device, the clutch actuators 31 and 61 correspond to a clutch driving device, the rear wheel 8 corresponds to a driving wheel, the main frame 1 corresponds to a main frame, and the sub-frame 2 corresponds to a sub-frame.

Also, the valve block 34 corresponds to a fluid path switching valve, the accumulator 33 corresponds to a pressure accumulator, oil tank 36 corresponds to a storage tank, the electric motor 621 corresponds to a first electric motor, the gearbox 622 corresponds to a transmitting mechanism, and the electric motor 611 corresponds to a second electric motor.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A motorcycle comprising:
    a driving wheel;
    an engine that generates power;
    a transmission arranged to switch to a plurality of transmitting states that transmit power to the driving wheel at different gear ratios;
    a clutch operable in a connected state in which the power generated by the engine is transmitted to the transmission and a disconnected state in which the power generated by the engine is not transmitted to the transmission;
    a main frame that holds the engine;
    a sub-frame that is attached to a rear end portion of the main frame so as to extend rearward from the rear end portion of the main frame;
    a clutch driving device that switches the clutch between the connected state and the disconnected state; and
    a shift driving device that performs a shift operation to shift the transmitting state of the transmission; wherein the shift driving device is attached to the sub-frame.

2. The motorcycle according to claim 1, wherein the clutch driving device is attached to the sub-frame.

3. The motorcycle according to claim 1, wherein the shift driving device is a hydraulic shift driving device.

4. The motorcycle according to claim 3, wherein the clutch driving device is a hydraulic clutch driving device.

5. The motorcycle according to claim 4, further comprising a pump that generates a hydraulic pressure supplied to the hydraulic shift driving device and the hydraulic clutch driving device, wherein the pump is attached to the sub-frame.

6. The motorcycle according to claim 4, further comprising a fluid path switching valve that switches a fluid path that circulates through the hydraulic shift driving device, the hydraulic clutch driving device, and the pump, wherein the fluid path switching valve is attached to the sub-frame.

7. The motorcycle according to claim 4, further comprising a pressure accumulator that accumulates a pressure of an operating fluid supplied to the hydraulic shift driving device and the hydraulic clutch driving device, wherein the pressure accumulator is attached to the sub-frame.

8. The motorcycle according to claim 4, further comprising a storage tank that stores an operating fluid supplied to the hydraulic shift driving device and the hydraulic clutch driving device, wherein the storage tank is attached to the sub-frame.

9. The motorcycle according to claim 1, wherein the shift driving device is an electrically-driven shift driving device.

10. The motorcycle according to claim 9, wherein the clutch driving device is an electrically-driven clutch driving device.

11. The motorcycle according to claim 10, wherein the shift driving device includes a first electric motor and a transmitting mechanism that transmits power of the first electric motor to the transmission, the clutch driving device includes a second electric motor and a master cylinder that converts power of the second electric motor into a hydraulic pressure, and the first electric motor, the second electric motor, and the master cylinder are attached to the sub-frame.

12. The motorcycle according to claim 1, further comprising a battery that accumulates electric power and an electric component that operates with the electric power accumulated in the battery, wherein the battery is held by the main frame in a position further forward than the engine.

* * * * *